United States Patent
Neukirch

(10) Patent No.: US 9,308,762 B2
(45) Date of Patent: Apr. 12, 2016

(54) COLOR ACCEPTOR REACTING IN A COLOR-FORMING MANNER TO A PIGMENT PRECURSOR AND HEAT-SENSITIVE RECORDING MATERIAL HAVING SUCH A COLOR ACCEPTOR

(75) Inventor: Matthias Neukirch, Flensburg (DE)

(73) Assignee: Mitsubishi HiTec Paper Europe GmbH, Flensburg (DE)

( * ) Notice: Subject to any disclaimer, the term of this patent is extended or adjusted under 35 U.S.C. 154(b) by 83 days.

(21) Appl. No.: 14/347,726

(22) PCT Filed: Aug. 11, 2012

(86) PCT No.: PCT/EP2012/065773
§ 371 (c)(1),
(2), (4) Date: Mar. 27, 2014

(87) PCT Pub. No.: WO2013/045164
PCT Pub. Date: Apr. 4, 2013

(65) Prior Publication Data
US 2014/0235437 A1    Aug. 21, 2014

(30) Foreign Application Priority Data

Sep. 30, 2011    (EP) ..................................... 11183634

(51) Int. Cl.
| | |
|---|---|
| *B41M 5/333* | (2006.01) |
| *B41M 5/42* | (2006.01) |
| *C09D 11/00* | (2014.01) |
| *B41M 5/327* | (2006.01) |
| *B41M 5/337* | (2006.01) |

(52) U.S. Cl.
CPC ........... *B41M 5/3335* (2013.01); *B41M 5/3275* (2013.01); *B41M 5/333* (2013.01); *B41M 5/3331* (2013.01); *B41M 5/3333* (2013.01); *B41M 5/3372* (2013.01); *C09D 11/00* (2013.01); *B41M 5/426* (2013.01); *B41M 2205/04* (2013.01); *B41M 2205/38* (2013.01)

(58) Field of Classification Search
CPC .. B41M 5/3275; B41M 5/333; B41M 5/3331; B41M 5/3333; B41M 5/3335; B41M 5/426; B41M 2205/04; B41M 2205/38; C09D 11/00
USPC ............ 503/214, 216, 217; 528/361; 560/190
See application file for complete search history.

(56) References Cited

U.S. PATENT DOCUMENTS

2014/0134441 A1* 5/2014 Dropsit et al. ................. 428/430

* cited by examiner

*Primary Examiner* — Bruce H Hess
(74) *Attorney, Agent, or Firm* — Cozen O'Connor

(57) ABSTRACT

A color acceptor for chemical reaction with a dye precursor to form a visually recognizable color. The color acceptor is constructed of lactic acid monomers. Also disclosed is a heat-sensitive recording material with a substrate and a heat-sensitive recording layer, wherein the heat-sensitive recording layer contains at least one dye precursor and at least one color acceptor which react with one another in a color-forming manner when heat is applied, and wherein the color acceptor is constructed of lactic acid monomers.

20 Claims, No Drawings

COLOR ACCEPTOR REACTING IN A COLOR-FORMING MANNER TO A PIGMENT PRECURSOR AND HEAT-SENSITIVE RECORDING MATERIAL HAVING SUCH A COLOR ACCEPTOR

PRIORITY CLAIM

This is a U.S. national stage of application No. PCT/EP2012/065773, filed on Nov. 8, 2012. Priority is claimed on the following application: Country: Europe, Application No.: 11183634.2, Filed: Sep. 30, 2011, the content of which is incorporated in its entirety herein by reference.

FIELD OF THE INVENTION

The invention is directed first to a novel color acceptor which is capable of reacting with a dye precursor in a color-forming manner. The invention is also directed to a heat-sensitive recording material comprising a substrate and a heat-sensitive recording layer formed thereon, wherein this recording layer contains the novel color acceptor.

BACKGROUND OF THE INVENTION

Heat-sensitive recording materials have been known for many years and have enjoyed a largely steady popularity. This may be explained in part by the fact that their use is associated with great advantages for merchants distributing tickets and/or sales receipts. Due to the fact that the color-forming components in the heat-sensitive recording process are contained in the recording material itself, it is possible to employ large numbers of thermal printers which operate without toner or ink cartridges and whose function need no longer be monitored by persons at regular intervals. Accordingly, this innovative technology has had extensive success particularly in public transportation and in the retail industry.

Increasingly over recent years, however, concerns have been voiced over the environmental soundness of certain color acceptors which, although they have no scientific basis whatsoever, cannot be ignored by industry, particularly commerce. Heat-sensitive recording materials containing
  bisphenol A, i.e., 2,2-bis(4-hydroxyphenyl)propan and
  bisphenol S, i.e., 4,4'-dihydroxydiphenyl sulfone
have been the focus of especial criticism which has primarily led to increased use of
  Pergafast® 201, i.e., N-(p-toluenesulphonyl)-N'-3-(p-toluenesulphonyloxyphenyl)urea made by BASF Corporation, and
  D8, i.e., 4-[(4-(1-methylethoxy)phenyl)sulfonyl]phenol.
In considering this market situation which has changed completely within a very brief period of time, the inventor recognized the need for a novel color acceptor which, on the hand, is as completely biodegradable as possible and not harmful to the environment and which, on the other hand, must be at least economically practical, since ultimately even the best products must remain affordable and be affordable for the user.

SUMMARY OF THE INVENTION

This problem is solved by a novel color acceptor for chemical reaction with a dye precursor to form a visually recognizable color, wherein the color acceptor is characterized in that it is constructed from lactic acid monomers. The lactic acid may be represented by the following formula 1:

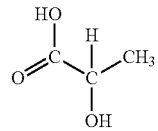

Formula 1

More precisely and, to this extent, in a more restricted sense, the invention provides polylactic acid which is used as color acceptor or as part of the color acceptor. Polylactic acid is characterized in that it is a completely biodegradable plastic as specific embodiment of polyester, particularly when the polylactic acid is a compound of dextrorotatory lactic acids (L+lactic acid) which is regarded as particularly preferable within the framework of the present invention. Because polylactic acid contains at the two ends of the long polymer molecules an unusable hydroxyl group and also only one carboxyl group that may be considered as reactive with the pre-dye precursors, it represents a preferred embodiment of the invention when oligomers as short-chain polymers of polylactic acid are used as color acceptor or as part of the color acceptor. The oligomers of polylactic acid can be represented by the following formula 2:

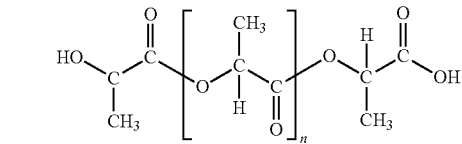

Formula 2

$n = 4$-$50$ (Lactic acid units)

After intensive investigations upon which the present invention is based, the inventor recognized that it is advantageous to increase the quantity of usable carboxyl groups by n-fold grouping of the oligomers of polylactic acid around an n-valent acid, which is to be regarded as a particularly preferred embodiment of the present invention.

Examples of the particularly preferred divalent acids are those acids selected from the list comprising oxalic acid, malonic acid, succinic acid, glutaric acid, adipic acid, pimelic acid, suberic acid, azelaic acid, sebacic acid, undecanedioic acid, dodecanedioic acid, tridecanoic diacid, tetradecanoic acid, hexadecanoic acid.

A molecule of this type may be represented by formula 3:

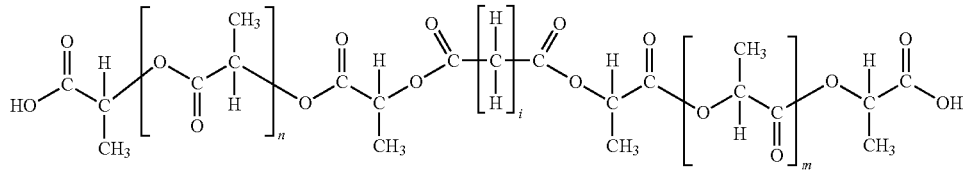

Formula 3

$n = 1$-$50$ (Lactic acid units)
$m = 1$-$50$ (Lactic acid units)
$i = 0$-$18$

Further examples of a divalent acid are those acids selected from the list comprising maleic acid, fumaric acid, malic acid, tartaric acid, glutamic acid, aspartic acid, phthalic acid, isophthalic acid, terephthalic acid.

A particularly preferred example of a divalent acid that is very useful for purposes of the present invention is oxalic acid, which leads to a molecule as color acceptor from a central oxalic acid molecule and two oligomers of polylactic acid. A molecule of this type is regarded as a particularly preferred example of a color acceptor according to the invention which is capable of reacting with a dye precursor to form a visually recognizable color.

Within the framework of the present invention, it is further regarded as particularly preferable to group the oligomers of polylactic acid threefold around a trivalent acid, particularly citric acid, which leads to a molecule as color acceptor from a central citric acid molecule and three oligomers of polylactic acid. A molecule of this type is a particularly preferable example of a color acceptor according to the invention which is capable of reacting with a dye precursor in a color-forming manner. A molecule of this type can be represented according to formula 4:

Drawing upon the considerations set forth in the preceding, the inventor considers it preferable when the color acceptor contains a molecule from an n-valent acid and oligomers of polylactic acid which are grouped n-fold around this acid or is formed by this molecule.

In a particularly preferred embodiment, the heat-sensitive recording layer contains at least one dye precursor and a combination of at least two different color acceptors, wherein each of the two different color acceptors contains a molecule from an n-valent acid and oligomers of polylactic acid which are grouped n-fold around this acid or is formed by this molecule.

The combination of
at least a first color acceptor containing a molecule or formed of a molecule from an n-valent acid and oligomers of polylactic acid which are grouped n-fold around this acid
and at least a second color acceptor containing a molecule or formed of a molecule from an m-valent acid and oligomers of polylactic acid which are grouped m-fold around this acid,

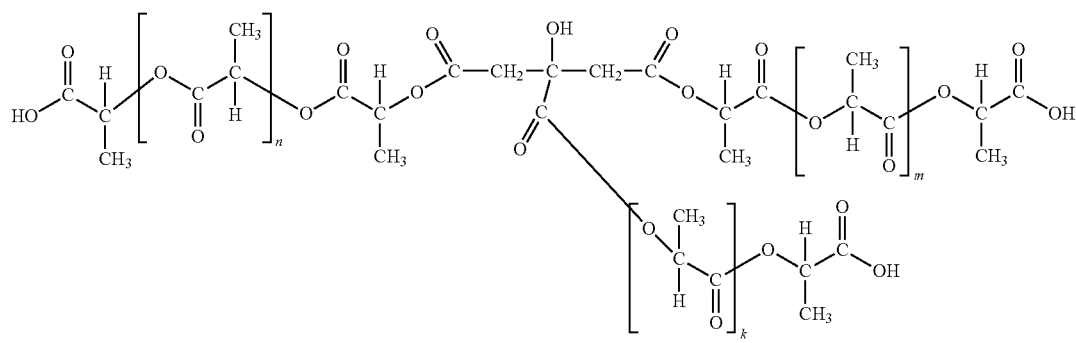

Formula 4

$n = 1\text{-}50$ (Lactic acid units)
$m = 1\text{-}50$ (Lactic acid units)
$k = 1\text{-}50$ (Lactic acid units)

The invention is also directed to a color-reactive recording material with a substrate and a color-reactive recording layer formed thereon, wherein this recording layer contains the novel color acceptor. A pressure-sensitive recording material which contains at least one dye precursor on the one hand and
at least one color acceptor in one of the above-mentioned embodiments on the other hand either in an individual layer or in two separate layers is regarded in the first instance as preferred color-reactive recording material. In this regard, either the at least one dye precursor and/or at least the one color acceptor according to the embodiments proposed herein can be encapsulated.

Further, a heat-sensitive recording material is regarded as particularly preferred color-reactive recording material. In its simplest embodiment, a heat-sensitive recording material of this type provides a substrate and a heat-sensitive recording layer, wherein the heat-sensitive recording layer contains at least one dye precursor and at least one color acceptor which react with one another in a color-forming manner when heat is applied. The heat-sensitive recording material is characterized in that the color acceptor is constructed by means of lactic acid monomers. According to the invention, a color acceptor of this type is capable of reacting with a dye precursor to form a visually recognizable color.

under the condition $m \neq n$, is particularly preferred. In this preferred instance, rheological factors of the coating compound can be specifically adjusted to form the heat-sensitive recording layer and the sensitivity thereof to color-initiating heat.

It is possible that the heat-sensitive recording layer has further color acceptors in addition to the at least one color acceptor in one of the embodiments suggested herein according to which it is constructed by means of lactic acid monomers, which further color acceptors are then selected particularly from the list comprising:

bisphenol A, i.e., 2,2-bis(4-hydroxyphenyl)propan,
bisphenol S, i.e., 4,4'-dihydroxydiphenyl sulfone,
Pergafast® 201, i.e., N-(p-toluenesulphonyl)-N'-3-(p-toluenesulphonyloxyphenyl)urea made by BASF Corporation,
D8, i.e., 4-[(4-(1-methylethoxy)phenyl)sulfonyl]phenol, but it is regarded as particularly preferred when the heat-sensitive recording layer of the heat-sensitive recording material suggested herein has exclusively one color acceptor or a combination of a plurality of color acceptors exclusively of this type which are constructed by means of lactic acid monomers corresponding to the aforementioned specifications for one of the embodiments suggested herein.

The heat-sensitive recording material suggested herein has as possible dye precursors in the heat-sensitive recording layer preferably at least one substance selected from the list comprising 3-diethylamino-6-methyl-7-anilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, 3-(N-ethyl-N-tolyl)amino-6-methyl-7-anilinofluoran, and 3-(N-ethyl-N-tetrahydrofuryl)amino-6-methyl-7-anilinofluoran. In this connection, 3-dibutylamino-6-methyl-7-anilinofluoran—also known as ODB-2—is regarded as particularly preferable.

However, in addition to these substances specified as dye precursors, the recording material according to the invention can further also contain within the heat-sensitive recording layer one or more of the following compounds which are absorbent in the near infrared range:
3,6-Bis(dimethylamino)fluorene-9-spiro-3'-(6'-dimethylaminophthalide), 3-diethylamino-6-dimethylaminofluorene-9-spiro-3'-(6'-dimethylaminophthalide), 3,6-bis(diethylamino)-fluorene-9-spiro-3'-(6'-dimethylaminophthalide), 3-dibutylamino-6-dimethylaminofluorene-9-spiro-3'-(6'-dimethylaminophthalide), 3-dibutylamino-6-diethylaminofluorene-9-spiro-3'-(6'- dimethylaminophthalide), 3,6-bis(dimethylamino)fluorene-9-spiro-3'-(6'-diethylaminophthalide), 3-diethylamino-6-dimethylaminofluorene-9-spiro-3'-(6'-diethylaminophthalide), 3-dibutylamino-6-dimethylaminofluorene-9-spiro-3'-(6'-diethylaminophthalide), 3,6-bis-(di-ethylamino)fluorene-9-spiro-3'-(6'-diethylaminophthalide), 3,6-bis-(dimethylamino)-fluorene-9-spiro-3'-(6'-dibutylaminophthalide), 3-dibutylamino-6-diethylaminofluorene-9-spiro-3'-(6'-diethylaminophthalide), 3-diethylamino-6-dimethylaminofluorene-9-spiro-3'-(6'-dibutylaminophthalide), 3,3-bis[2-(4-dimethylamino-phenyl)-2-(4-methoxyphenyl)-ethenyl]-4,5,6,7-tetrachlorophthalide.

To increase thermal responsiveness, the recording layer of the heat-sensitive recording material according to the invention can preferably also contain. Examples of sensitizers of this type are: 2-(2H-benzotriazol-2-yl)-p-cresol, benzyl-p-benzyloxybenzoate, methylolstearamide, stearic acid amide, p-benzylbiphenyl, 1,2-di(phenoxy)ethane, 1,2-di(m-methylphenoxy)ethane, m-terphenyl, dibenzyloxalate, benzyl naphthyl ether, dimethyl terephtalate, and diphenyl sulfone, most preferably methylolstearamide and, in particular, stearic acid amide and dimethyl terephtalate.

Suitable binders for incorporating in the heat-sensitive recording layer are, for example, water-soluble binders such as starch, hydroxy ethyl cellulose, methyl cellulose, carboxy methyl cellulose, gelatins, casein, polyvinyl alcohols, modified polyvinyl alcohols, ethylene vinyl alcohol copolymers, sodium polyacrylates, acrylamide/acrylate copolymers, acrylamide/acrylate/methacrylate terpolymers, and alkali salts of styrene maleic acid anhydride copolymers or ethylene maleic acid anhydride copolymers, wherein the binders can be used alone or in combination with one another; also, water-insoluble latex binders such as styrene-butadiene copolymers, acryl nitrile butadiene copolymers, and methyl acrylate butadiene copolymers can be used as binders for incorporation in the heat-sensitive recording layer. Within the meaning of the present invention, polyvinyl alcohol, ethylene vinyl alcohol copolymers, or polyvinyl alcohol in combination with ethylene vinyl alcohol copolymers are particularly preferred binders which are incorporated together in the heat-sensitive recording layer in a range of from 10 to 20 percent by weight based on the total weight of the recording layer.

To improve sliding properties with respect to a thermal head and to prevent excessive wear of the thermal head, the heat-sensitive recording layer can also contain lubricants and release agents such as metal salts of higher fatty acids, for example, zinc stearate, calcium stearate, and waxes such as, e.g., paraffin, oxidized paraffin, polyethylene, polyethylene oxide, stearic acid amide, and castor wax. Other possible constituents of the recording layer are, for example, pigments, preferably inorganic pigments such as, for example, aluminum (hydr)oxide, silicic acid, and calcium carbonate. Particularly calcium carbonate which is preferably incorporated in the recording layer in a quantity of from 0 to 45 percent by weight, most preferably in a quantity of from 10 to 40 percent by weight, based in each instance on the total weight of the recording layer is regarded as preferable here.

Roll doctor coating units, knife coating units, curtain coaters, or air brushes can be used in particular as coating devices for applying the heat-sensitive recording layer. The basis weight of the heat-sensitive recording layer is preferably between 2 $g/m^2$ and 6 $g/m^2$ or, better still, between 2.2 $g/m^2$ and 4.8 $g/m^2$.

In a particularly preferred embodiment, the heat-sensitive recording material according to the invention has a pigment-containing intermediate layer arranged between substrate and heat-sensitive recording layer.

The pigments of the intermediate layer can be organic hollow pigments as well as inorganic pigments, the latter preferably being selected from the group comprising both natural and calcined kaolin, silicon oxide and, in particular, bentonite, calcium carbonate and aluminum hydroxide, particularly boehmite. On one hand, an intermediate layer of this type can contribute in a positive manner to the leveling of the surface to be coated so that the required amount of coating composition to be applied for the heat-sensitive recording layer is reduced. For this reason, leveling coating devices such as, e.g., roller coating units, knife coating units, and (roll) doctor coating units are suitable for applying the pigmented intermediate layer. On the other hand, the pigments of this intermediate layer can absorb the wax constituents of the heat-sensitive recording layer which are liquefied by the heating effect during formation of the print image and accordingly promote a more reliable and faster functioning of the heat-induced recording. The basis weight of the pigment-containing intermediate layer is preferably between 5 $g/m^2$ and 20 $g/m^2$ or, better yet, between 7 $g/m^2$ and 11 $g/m^2$.

The recording material according to the invention can further have a protective layer which is applied to the heat-sensitive recording layer and entirely or partially covers it. In particular, the protective layer can ensure that the recording layer below it is protected from organic solvents as well as from oils, fats, water and plasticizers.

Without limiting to paper as substrate, paper—and in this case especially a coating base paper that has not been surface-treated—is the most commercially accepted substrate, also as regards good environmental soundness due to favorable recyclability, and is preferred within the framework of the invention. By "coating base paper that has not been surface-treated" is meant a coating base paper that has not been treated in a size press or in a coating apparatus. Sheets, for example, of polypropylene, polyolefin and polyolefin-coated papers are also possible as the substrate for the invention, without this embodiment being limiting.

The data given in the description and claims respecting basis weight and percent by weight relate in each instance to dry weight, i.e., absolutely dry parts by weight.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A color acceptor for chemical reaction with a dye precursor to form a visually recognizable color, wherein said color acceptor contains a molecule from an n-valent acid and oligomers of polylactic acid which are grouped n-fold around said acid or is formed by said molecule.

2. The color acceptor according to claim 1, wherein said color acceptor contains a molecule from a central oxalic acid molecule and two oligomers of polylactic acid or is formed by said molecule.

3. The color acceptor according to claim 1, wherein said color acceptor contains a molecule from a central citric acid molecule and three oligomers of polylactic acid or is formed by said molecule.

4. A heat-sensitive recording material with a substrate and a heat-sensitive recording layer, wherein said heat-sensitive recording layer comprises at least one dye precursor and at least one color acceptor which react with one another in a color-forming manner when heat is applied, wherein said color acceptor is constructed of lactic acid monomers.

5. The heat-sensitive recording material according to claim 4, wherein said at least one color acceptor contains a molecule from an n-valent acid and oligomers of polylactic acid which are grouped n-fold around said acid or is formed by said molecule.

6. The heat-sensitive recording material according to claim 5, wherein said heat-sensitive recording layer comprises at least one dye precursor and a combination of
at least a first color acceptor containing a molecule or formed of a molecule from an n-valent acid and oligomers of polylactic acid which are grouped n-fold around said acid;
at least a second color acceptor containing a molecule or formed of a molecule from an m-valent acid and oligomers of polylactic acid which are grouped m-fold around said acid; and
wherein m≠n.

7. The heat-sensitive recording material according to claim 6, wherein said heat-sensitive recording layer comprises exclusively color acceptors constructed of lactic acid monomers.

8. The heat-sensitive recording material according to claim 6, wherein said heat-sensitive recording layer has as dye precursor at least one substance selected from the group comprising 3-diethylamino-6-methyl-7-anilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N cyclohexyl)amino-6-methyl-7-anilinofluoran, 3-(N-ethyl-N-tolyl)amino-6-methyl-7-anilinofluoran, and 3-(N-ethyl-N-tetrahydrofuryl)amino-6-methyl-7-anilinofluoran.

9. The heat-sensitive recording material according to claim 6, wherein said heat-sensitive recording layer comprises as binder a substance selected from the list comprising polyvinyl alcohol, ethylene vinyl alcohol copolymer or a combination of polyvinyl alcohol and ethylene vinyl alcohol copolymer.

10. The heat-sensitive recording material according to claim 6, wherein said recording material further has a pigment-containing intermediate layer which is arranged between said substrate and said heat-sensitive recording layer.

11. The heat-sensitive recording material according to claim 5, wherein said heat-sensitive recording layer comprises exclusively color acceptors constructed of lactic acid monomers.

12. The heat-sensitive recording material according to claim 5, wherein said heat-sensitive recording layer has as dye precursor at least one substance selected from the group comprising 3-diethylamino-6-methyl-7-anilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, 3-(N-ethyl-N-tolyl)amino-6-methyl-7anilnofluoran, and 3-(N-ethyl-N-tetrahydrofuryl)amino-6-methyl-7-anilinofluoran.

13. The heat-sensitive recording material according to claim 5, wherein said heat-sensitive recording layer comprises as binder a substance selected from the list comprising polyvinyl alcohol, ethylene vinyl alcohol copolymer or a combination of polyvinyl alcohol and ethylene vinyl alcohol copolymer.

14. The heat-sensitive recording material according to claim 4, wherein said heat-sensitive recording layer comprises exclusively color acceptors constructed of lactic acid monomers.

15. The heat-sensitive recording material according to claim 14, wherein said heat-sensitive recording layer has as dye precursor at least one substance selected from the group comprising 3-diethylamino-6-methyl-7-anilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N cyclohexyl)amino-6-methyl-7-anilinofluoran, 3-(N-ethyl-N-tolyl)amino-6-methyl-7-anilinofluoran, and 3-(N-ethyl-N-tetrahydrofuryl)amino-6-methyl-7-anilinofluoran.

16. The heat-sensitive recording material according to claim 4, wherein said heat-sensitive recording layer has as dye precursor at least one substance selected from the group comprising 3-diethylamino-6-methyl-7-anilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, 3-(N-ethyl-N-tolyl)amino-6-methyl-7anilnofluoran, and 3-(N-ethyl-N-tetrahydrofuryl)amino-6-methyl-7-anilinofluoran.

17. The heat-sensitive recording material according to claim 4, wherein said heat-sensitive recording layer comprises as binder a substance selected from the list comprising polyvinyl alcohol, ethylene vinyl alcohol copolymer or a combination of polyvinyl alcohol and ethylene vinyl alcohol copolymer.

18. The heat-sensitive recording material according to claim 4, wherein said recording material further has a pigment-containing intermediate layer which is arranged between said substrate and said heat-sensitive recording layer.

19. A color forming composition comprising a color acceptor and a dye precursor for forming a visually recognizable color, wherein said color acceptor is constructed of lactic acid monomers.

20. The color forming composition of claim 19, wherein said color acceptor contains oligomers of polylactic acid or is formed by oligomers of polylactic acid.

\* \* \* \* \*